United States Patent [19]
Yamashita et al.

[11] Patent Number: 5,335,077
[45] Date of Patent: Aug. 2, 1994

[54] TIME BASE CORRECTING DEVICE

[76] Inventors: Shinichi Yamashita; Shingo Ikeda; Makoto Gohda, all of c/o Canon Kabushiki Kaisha, 30-2, 3-chome, Shimomaruko, Ohta-ku, Tokyo, Japan

[21] Appl. No.: 906,267

[22] Filed: Jun. 26, 1992

[30] Foreign Application Priority Data

Jul. 3, 1991 [JP] Japan .................................. 3-189187
Jul. 3, 1991 [JP] Japan .................................. 3-189188

[51] Int. Cl.$^5$ ............................................. A04N 9/89
[52] U.S. Cl. ................................. 358/320; 358/326; 358/337
[58] Field of Search ............... 358/148, 149, 158, 159, 358/320, 326, 325, 336, 337, 160, 324, 19; H04N 5/04, 9/46, 9/455, 9/89, 5/95

[56] References Cited

U.S. PATENT DOCUMENTS

| | | | |
|---|---|---|---|
| 4,709,276 | 11/1987 | Yoshinaka | 358/326 |
| 4,766,495 | 8/1988 | Koboyashi et al. | 358/148 |
| 4,780,770 | 10/1988 | Wagner | 358/326 |
| 4,802,026 | 1/1989 | Kaneko et al. | 358/320 |
| 5,128,747 | 7/1992 | Isnardi et al. | 358/142 |
| 5,161,032 | 11/1992 | Kobayashi et al. | 358/326 |

*Primary Examiner*—James J. Groody
*Assistant Examiner*—Michael H. Lee

[57] ABSTRACT

A time base correcting device inputs a video signal including a sync. signal and a burst signal, produces an error signal representing a phase difference between a clock signal synchronized with the sync. signal and the burst signal, writes the video signal into the memory in synchronism with the clock signal having a phase thereof adjusted in accordance with the error signal, produces an interpolation signal to interpolate a plurality of adjacent error signals along a time base and controls the readout from the memory by the error signals and the interpolation signal. In this manner, it attains time base correction, particularly velocity error correction with high accuracy.

22 Claims, 9 Drawing Sheets

TIME BASE CORRECTING DEVICE

BACKGROUND OF THE INVENTION

Field of the Invention

The present invention relates to a time base correcting device for eliminating jitter contained in a reproduced video signal in a video signal recording and/or reproducing apparatus.

Related Background Art

A time base correcting device called a digital time base collector (TBC) has been known as a device for eliminating jitter contained in the video signal.

In such a device, an input video signal is sampled at a clock which follows the jitter contained in the input video signal, resulting data in the form of digital signal is written in a memory and the data is read from the memory with a stable and constant clock and it is converted to an analog signal to produce a jitter-free input video signal.

Figure 1:
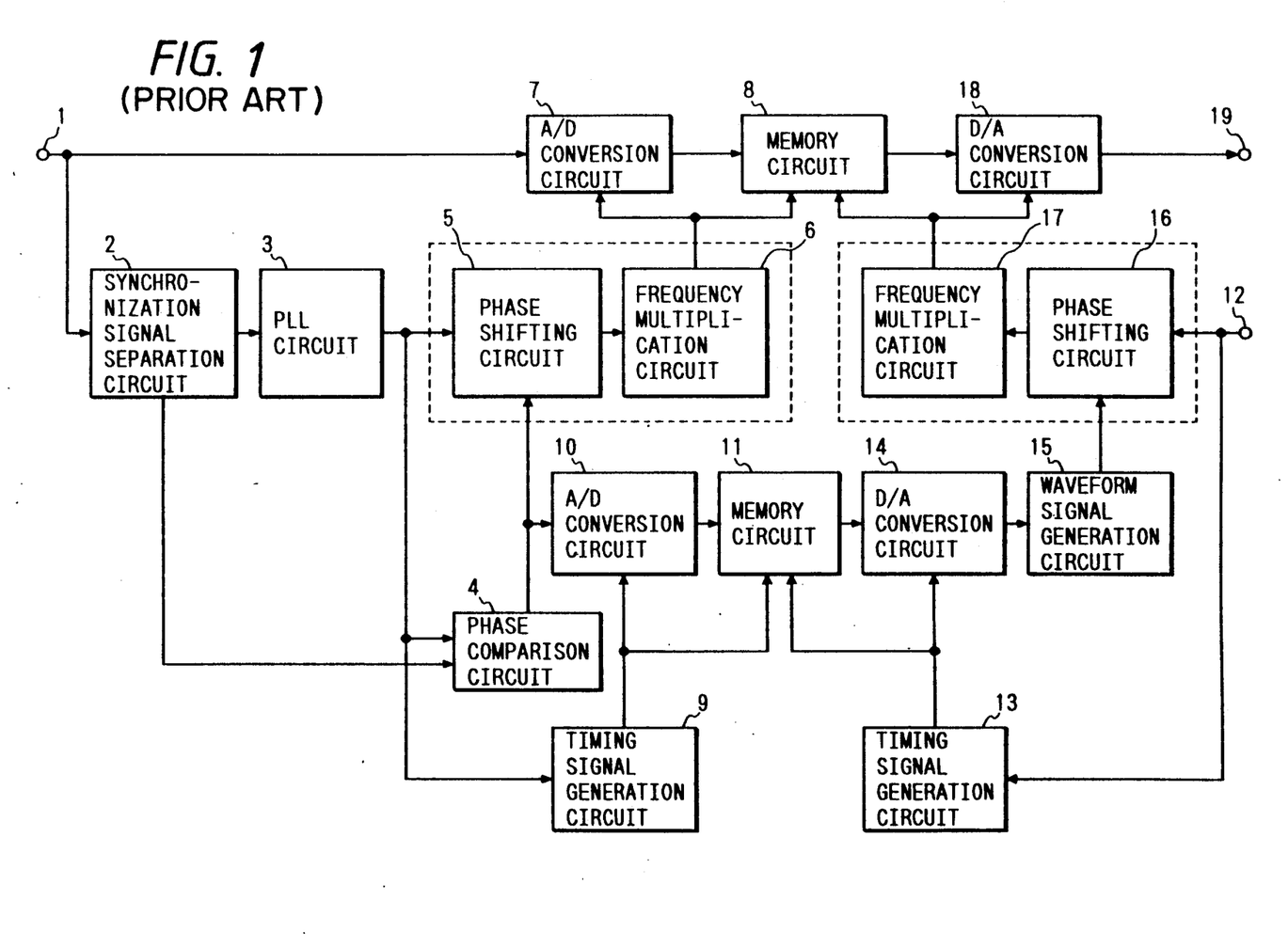
FIG. 1 shows a configuration of a prior art time base correcting device.

A prior art configuration of the time base correcting device for eliminating the jitter contained in the input video signal is shown in FIG. 1.

Figure 2:
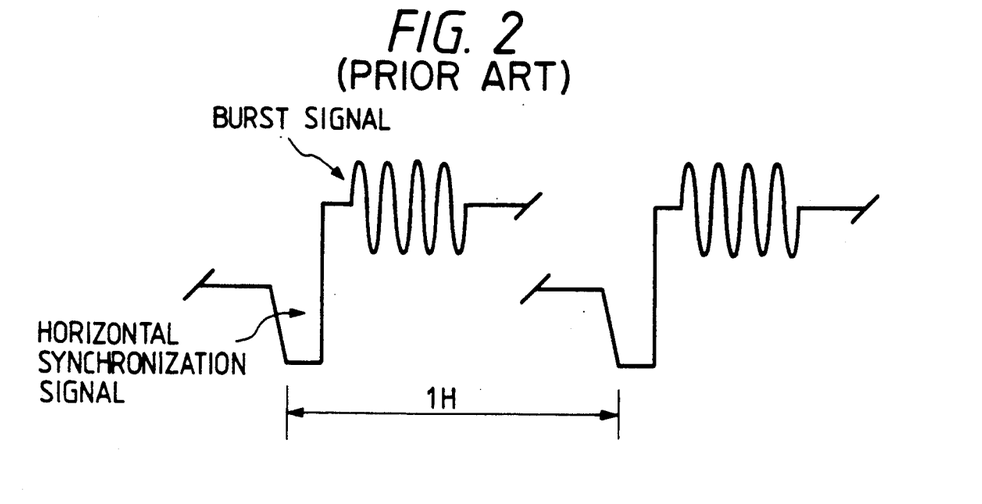
FIG. 2 illustrates a burst signal and a horizontal sync. signal in a video signal.

Numeral 1 denotes an input terminal to which a video signal which contains jitter is applied. The video signal includes a horizontal sync. signal and a burst signal as shown in FIG. 2. The video signal applied to the input terminal 1 is separated into the horizontal sync. signal and the burst signal by a sync. signal separation circuit 2, and the horizontal sync. signal is supplied to a phase lock loop (PLL) circuit 3 while the burst signal is supplied to a phase comparator 4.

The PLL circuit 3 generates a clock having the same frequency as that of the burst signal, which is phase-locked to the horizontal sync. signal. The phase comparator 4 compares phases of the output of the PLL circuit 3 and the burst signal from the sync. signal separation circuit 2. A phase difference signal is supplied from the phase comparator 4 to a phase shift circuit 5 which shifts a phase of the output clock of the phase sync. circuit 3 in accordance with the phase difference signal supplied from the phase comparator 4.

In this manner, a clock having the same phase and the same frequency as those of the burst signal is produced. The output from the phase shift circuit 5 is converted to a signal having an N-multiple frequency by a frequency multiplier 6.

In this manner, the video signal applied to the input terminal 1 is sampled by an A/D converter 7 by the output of the phase shift circuit 5, and it is digitized and written into a memory (memory means) 8.

In this manner, data which is completely free from jitter at least at the position of the burst signal is written into the memory 8.

However, the phase of the video signal varies even in one horizontal sync. period a large phase error occurs particularly in a latter half of each horizontal sinc. period. The phase error in one horizontal sync. period is called a velocity error. The velocity error may be corrected by a memory read circuit to be described later.

The output of the phase comparator 4 is converted from the analog signal to a digital signal by a second A/D converter 10 for each horizontal sync. period in accordance with a timing signal generated by a timing signal generator 9, and it is written into a second memory (memory means) 11. The data written in the second memory 11 is read out by a timing signal generated for each horizontal sync. period by a second timing signal generator 13 which receives a reference clock having the same frequency as that of the burst signal applied to a clock input terminal 12, and it is converted from the digital signal to an analog signal by a D/A converter 14.

A waveform signal generator (waveform signal generation means) 15 generates a velocity error correction waveform signal based on the data from the D/A converter 14. The velocity error correction waveform signal generated by the waveform signal generator 15 is supplied to a second phase shift circuit 16.

The second phase shift circuit 16 shifts the phase of the reference clock applied to the clock input terminal 12 in accordance with the velocity error correction waveform signal, sends it to a second frequency multiplier 17 to convert it to an N-multiple frequency signal for use as a read clock for the memory 8 and a conversion clock for a second D/A converter 18. The output from the second D/A converter 18 is produced at an output terminal 19.

The readout from the second memory 11 must be one horizontal sync. period ahead of the readout timing of the first memory because the last velocity error value in the horizontal sync. period is required to generate the velocity error correction waveform signal from the waveform signal generator 15.

Figure 3A:
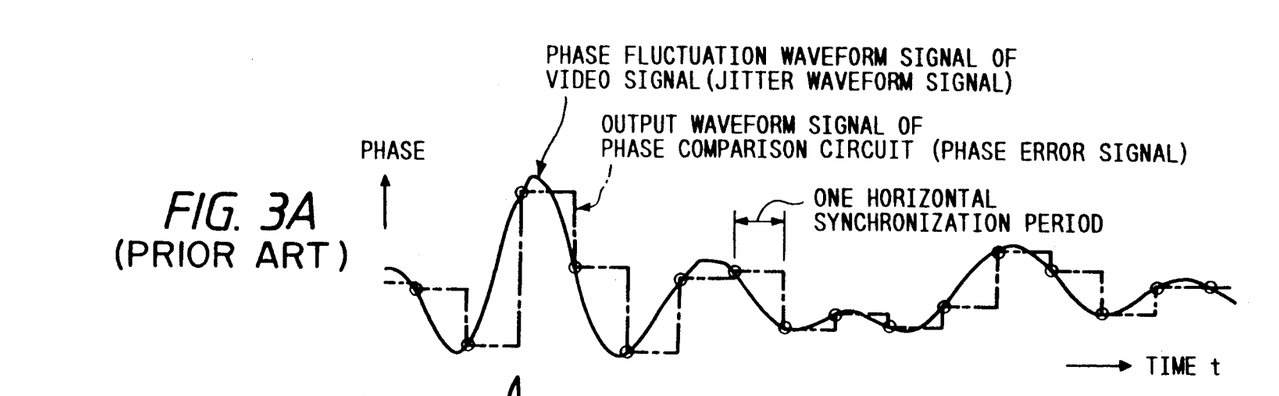
FIGS. 3A to 3C show timing charts for explaining an operation of FIG. 1.
Figures 3B, 3C:
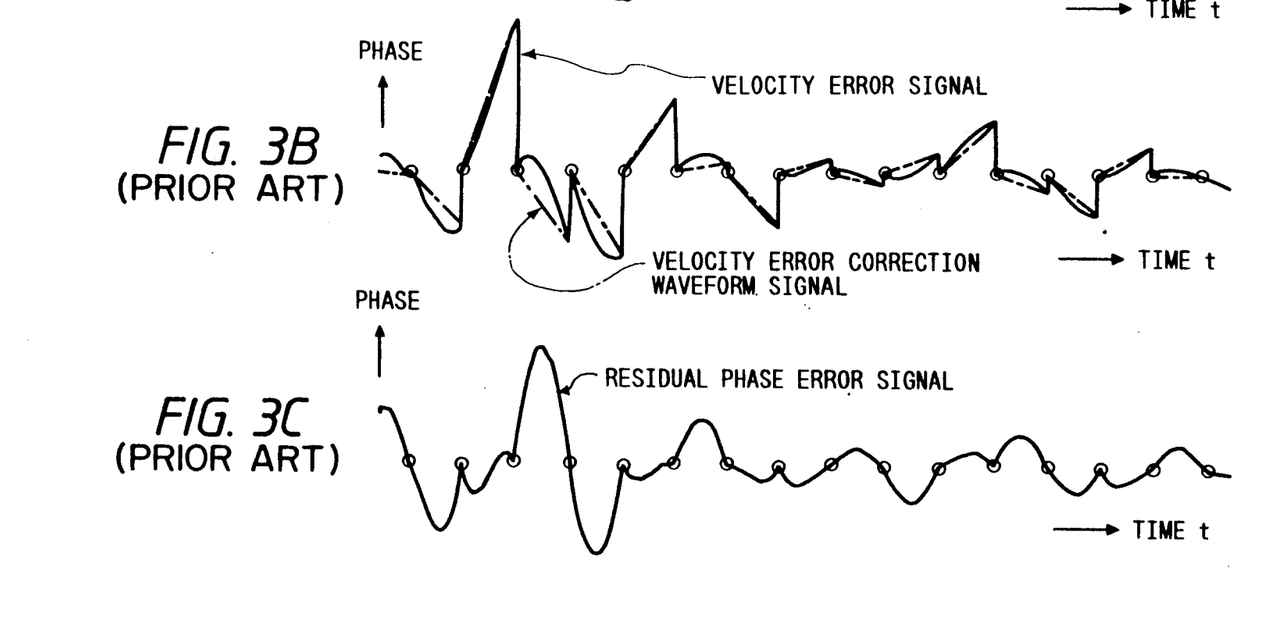

Operational waveforms of the time base correcting circuit are shown in FIG. 3 in which an ordinate represents a phase and an abscissa represents a time t. A solid line in FIG. 3A shows a waveform of a phase variation waveform signal (jitter waveform signal) of the video signal input, and a chain line shows a waveform of an output waveform signal of the phase comparator 4.

The phase of the clock applied to the first A/D converter 7 follows the output waveform signal of the phase comparator 4. The phase of the data written in the first memory 8 represents a difference between the phases of the output waveform signal of the phase comparator 4 and the video signal, that is, the velocity error signal, which is shown by a solid line in FIG. 3B. The waveform signal generator 15 generates a sawtooth wave velocity error correction waveform signal having a gradient which is proportional to the variation per horizontal sync. period of the output waveform signal of the phase comparator 4, a waveform thereof is shown by a chain line in FIG. 3B.

The readout clock of the first memory 8 is phase-shifted by the velocity error correction waveform signal generated by the waveform signal generator 15 so that the output of the second D/A converter 18 is free from the velocity error.

Figure 4:
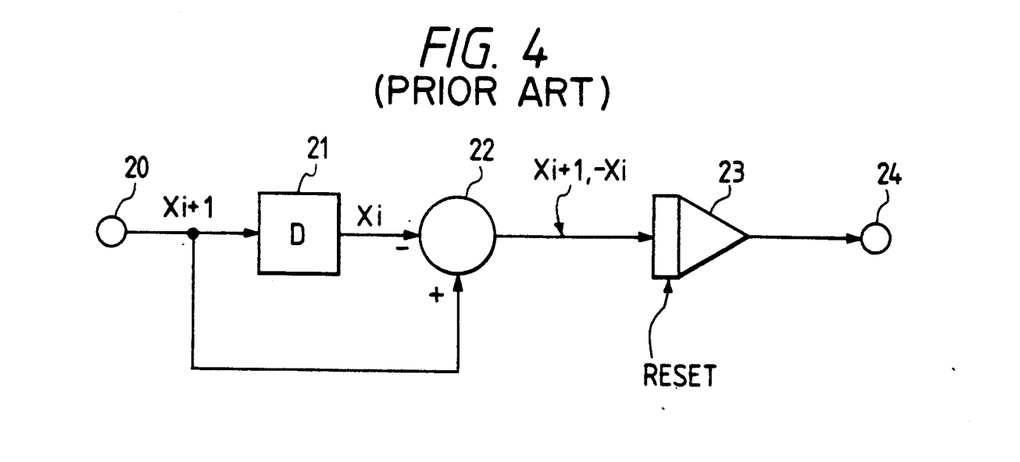
FIG. 4 shows a block diagram of a specific configuration of a waveform signal generator of FIG. 1.

The waveform signal generator 15 may be configured as shown in FIG. 4, in which numeral 20 denotes an input terminal to which the phase error signal from the phase comparator 4 of FIG. 1 is applied through the D/A converter 14. The phase error signal $X_{i+1}$ applied to the input terminal 20 is supplied to a 1H delay circuit 21 and a subtractor 22 to which an output $X_i$ of the 1H delay circuit 21 is also supplied. A difference $\Delta PE$ ($=X_{i+1}-X_i$) of the phase error signal in one horizontal sync. period is produced at the output of the subtractor 22. Numeral 23 denotes an integration circuit having a reset input which is reset at every horizontal sync. period. The integration circuit 23 integrates the difference $\Delta PE$ to generate the sawtooth wave velocity error correction waveform signal having an amplitude proportional to the difference ΔPE, at the output terminal 24.

In the above prior art time base correcting circuit, however, since the velocity error in one horizontal sync. period is approximated linearly, there is a phase error which is not corrected, that is, there remains a residual phase error when the phase change (velocity) of the video signal varies in one horizontal sync. period.

FIG. 3C shows a waveform of such a residual phase error signal. It poses a problem because the residual phase error tends to be large at a center of the image which significantly adversely affects a visual display of the image.

In the prior art device, since the input/output characteristics of the second phase shift circuit 16 and the phase comparator 4 are different from each other, a level conversion circuit 18 for adjusting the signal levels to absorb the difference should be inserted between the waveform signal generator 15 and the second phase shift circuit, and between the phase comparator 4 and the phase shift circuit 5.

As a result, there is an error which depends on the conversion accuracy of the level conversion circuit, between the velocity error which is eliminated by the clock from the second phase shift circuit 16 and the velocity error actually detected by the phase comparator 4.

Where the input/output characteristics of the second phase shift circuit 16 and the phase comparator 4 are not linear, the circuit configuration of the level conversion circuit is very complicated and the level conversion accuracy is low. In the prior art, the circuit configurations of the second phase shift circuit 19 and the second frequency multiplier 20 are also complicated.

SUMMARY OF THE INVENTION

It is an object of the present invention to solve the above problems.

It is another object of the present invention to provide a time base correcting device which corrects a velocity error of a video signal in each horizontal sync. period with a high accuracy.

In order to achieve the above objects, one aspect of the present invention provides a time base correcting device comprising:
- (a) input means for inputting a video signal including a sync. signal and a burst signal;
- (b) means for generating a first clock signal synchronized with the sync. signal of the video signal inputted by said input means;
- (c) phase difference detection means for detecting a phase difference between said burst signal and said first clock signal at a predetermined interval to produce an error signal representing said phase difference;
- (d) phase adjustment means for adjusting the phase of said first clock in accordance with said error signal;
- (e) a memory for storing the video signal supplied from said input means in synchronism with said first clock supplied through said phase adjustment means;
- (f) interpolation means for generating an interpolation signal at said predetermined interval for interpolating a plurality of adjacent error signals along a time base; and
- (g) readout control means for controlling the readout from said memory by said error signal and said interpolation signal.

In accordance with another aspect of the present invention, there is provided a time base correcting device comprising:
- (a) input means for inputting a video signal including a signal of a predetermined frequency;
- (b) a memory for storing the video signal inputted by said input means;
- (c) phase variation detection means for detecting a phase variation in said signal of the predetermined frequency to produce an error signal related to the phase variation;
- (d) interpolation means for generating an interpolation signal to interpolate a plurality of adjacent error signals along a time base at said predetermined interval; and
- (e) readout control means for controlling the readout from said memory by said error signals and said interpolation signal.

In accordance with other aspect of the present invention, there is provided a time base correcting device comprising:
- (a) input means for inputting a video signal including a signal of a predetermined frequency;
- (b) phase variation detection means for detecting a phase variation of said signal of the predetermined frequency at a predetermined interval to produce an error signal related to the phase variation;
- (c) interpolation means for generating an interpolation signal to interpolate a plurality of adjacent error signals along a time base at said predetermined interval; and
- (d) means for eliminating a time base variation of the video signal by said error signals and said interpolation signal.

In accordance with other aspect of the present invention, there is provided a time base correcting device comprising:
- (a) input means for inputting a video signal including a signal of a predetermined frequency;
- (b) phase variation detection means for detecting a phase variation of said signal of the predetermined frequency at a predetermined interval to produce an error signal related to the phase variation;
- (c) modifying means for generating a modified error signal reflecting at least three adjacent error signals along a time base; and
- (d) means for eliminating a time base variation of the video signal by said modified error signal.

In accordance with other aspect of the present invention, there is provided a time base correcting device comprising:
- (a) input means for inputting a video signal including a sync. signal and a burst signal;
- (b) means for generating a clock signal synchronized with the sync. signal of the video signal inputted by said input means;
- (c) first phase comparison means for comparing phases of said burst signal and said clock signal at a predetermined interval to produce a first error signal;
- (d) phase adjustment means for adjusting the phase of said clock in accordance with said first error signal;
- (e) memory means for storing the video signal supplied from said input means in synchronism with said clock supplied through said phase adjustment means;
- (f) controlled oscillation means;

(g) second phase comparison means for comparing the phases of the output of said controlled oscillation means and a signal of a predetermined frequency to produce a second error signal; said second phase comparison means having substantially identical input/output characteristic to that of said first phase comparison means;

(h) adding means for adding a signal related to said first error signal and said second phase error signal and supplying the sum to said controlled oscillation means; and (i) readout control means for controlling the readout from said memory means by the output signal of said controlled oscillation means.

In accordance with other aspect of the present invention, there is provided a time base correcting device comprising:

(a) input means for inputting a video signal including a sync. signal of a predetermined frequency and a burst signal;

(b) means for generating a clock signal synchronized with the sync. signal of the video signal inputted by said input means;

(c) first phase comparison means for comparing phases of said burst signal and said clock signal to produce a first error signal;

(d) memory means for storing the video signal supplied from said input means in accordance with said first error signal;

(e) second comparison means for comparing phases of a signal having a frequency determined by said first error signal and a signal of a predetermined frequency to produce a second error signal; said second comparison means having an input/output characteristic substantially identical to that of said first comparison means; and (f) readout control means for controlling the readout from said memory by said second phase error signal.

In accordance with a further aspect of the present invention, there is provided a time base correcting device comprising:

(a) input means for inputting a video signal including a sync. signal and a burst signal;

(b) means for generating a clock signal synchronized with the sync. signal of the video signal inputted by said input means;

(c) first phase comparison means for comparing phases of said burst signal and said clock signal to produce a first error signal;

(d) second comparison means for comparing phases of a signal having a frequency determined by said first error signal and a signal of a predetermined frequency to produce a second error signal; said second comparison means having an input/output characteristic substantially identical to that of said first comparison means; and (e) means for eliminating a time base variation of the video signal by said first and second phase error signals.

Other objects and features of the present invention will be apparent from the following detailed description of the invention when taken in conjunction with the accompanying drawings.

DETAILED DESCRIPTION OF THE PREFERRED EMBODIMENTS

One embodiment of the present invention is now explained with reference to FIGS. 5 to 8. A main difference between the time base correcting device of the present embodiment and the prior art time base correcting device shown in FIG. 1 resides in a configuration of a waveform signal generator for generating a velocity error correction waveform signal.

Figure 5:
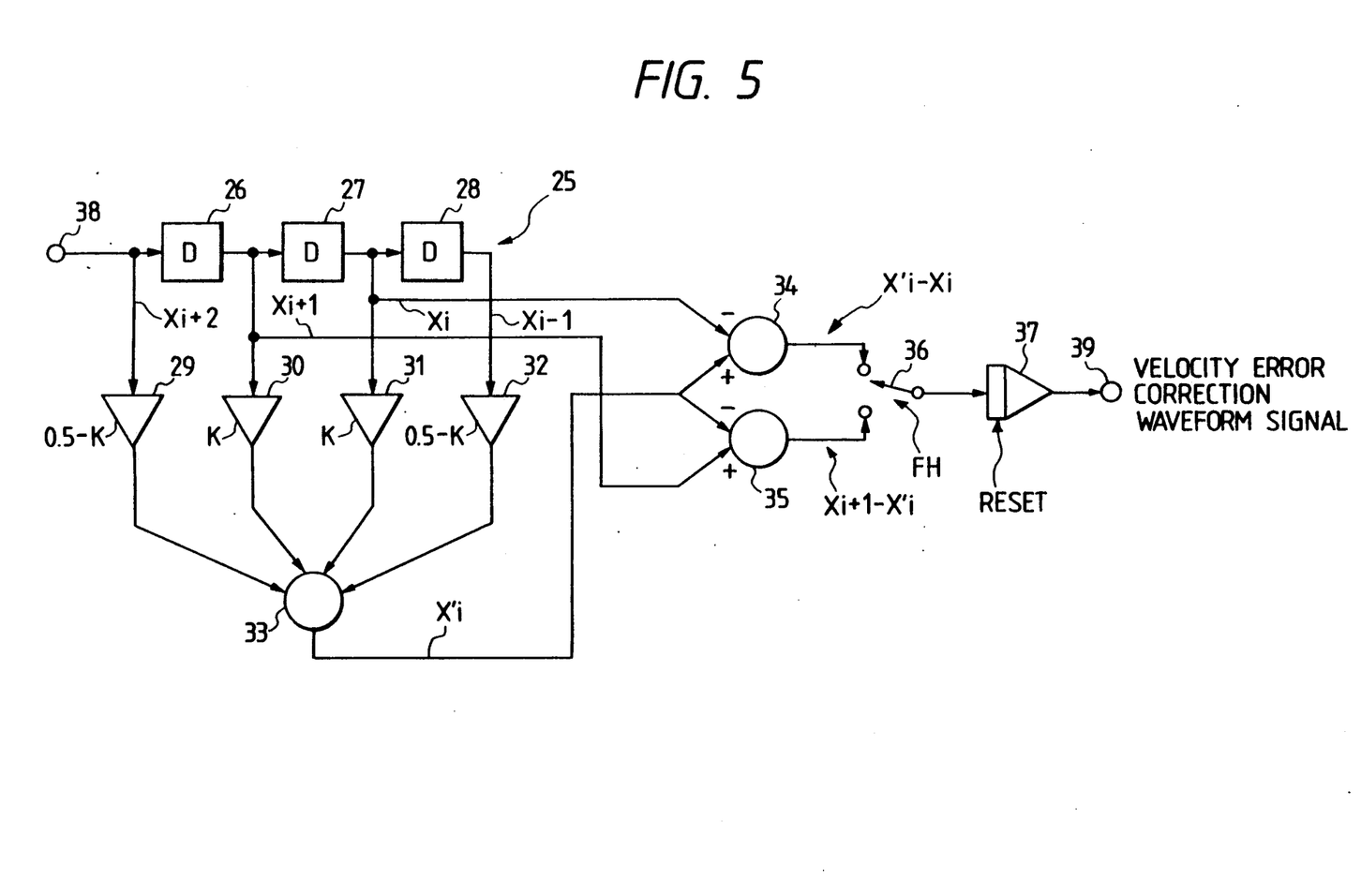
FIG. 5 shows a block diagram of a configuration of a waveform signal generator in one embodiment of a time base correcting device of the present invention.

FIG. 5 shows a block diagram of a waveform signal generator in the time base correcting device of the present embodiment. Numeral 25 denotes a waveform signal generator which comprises three 1H delay circuits 26, 27 and 28, four coefficient circuits 29, 30, 31 and 32, an adder 33, two subtractors 34 and 35, a switch 36 and an integrator 37.

The first to third 1H delay circuits 26–28 are connected in tandem, and an input terminal 38 to which a phase error signal is applied is connected to an input line of the first 1H delay circuit 26.

The phase error signal applied to the input terminal 38 is delayed by one horizontal period (1H) by each of the first to third 1H delay circuits 26–28.

An input line of the first coefficient circuit 29 is connected to a connecting line of the first 1H delay circuit 26 and the input terminal 38. An input line of the second coefficient circuit 30 is connected to a connecting line of the first 1H delay circuit 26 and the second 1H delay circuit 27. An input line of the third coefficient circuit 31 is connected to a connecting line of the second 1H delay circuit 27 and the third 1H delay circuit 28. An input line of the fourth coefficient circuit 32 is connected to an output line of the third 1H delay circuit 28.

The first to fourth coefficient circuits 29–32 weights the phase error signal applied to the input terminal 38 and the output signals from the first to third 1H delay circuits 26–28.

The first and fourth coefficient circuits 29 and 32 have a weight of 0.5−K, and the second and third coefficient circuits 30 and 31 have a weight of K.

The output lens of the first to fourth coefficient circuits 29–32 are connected to an input line of the adder 33.

The adder 33 adds the outputs of the first to fourth coefficient circuits 29-32 to produce a predicted phase error $X'_i$ at a midpoint of the 1H period, The first to fourth coefficient circuits 29-32 and the adder 33 form coefficient summing means. The output line of the adder 33 is connected to a (+) input terminal of the first subtractor 34 and a (−) input terminal of the second subtractor 35.

The output line of the second 1H delay circuit 27 is connected to the (−) input terminal of the first subtractor 34, which differentiates the output $X_i$ of the second 1H delay circuit 27 and the predicted phase error $X'_i$ at the output of the adder 33.

The output line of the first 1H delay circuit 26 is connected to the (+) input terminal of the second subtractor 35, which differentiates the output $X_{i+1}$ of the first 1H delay circuit 26 and the predicted phase error $X'_i$.

The output lines of the first and second subtractors 34 and 35 are connected to stationary contacts $36_1$ and $36_2$ of the switch 36, respectively. A movable contact 193 of the switch 36 is connected to the input line of the integrator 37.

The switch 36 selects one of the outputs of the first and second subtractors 34 and 35 by a timing signal FH. The output of the switch 36 is supplied to the integrator 37 and integrated therein, and outputted from an output terminal 39 as the velocity error correction waveform signal.

An operation of the waveform signal generator 25 is now explained with reference to FIG. 6.

Figure 6A:
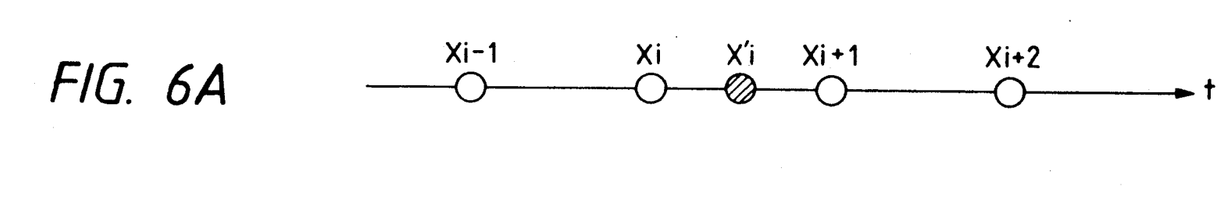
FIGS. 6A to 6D show timing charts for explaining an operation of the waveform signal generator of FIG. 5.

In FIG. 5, the first to third 1H delay circuits 26-28, the first to fourth coefficient circuits 29-32 and the adder 33 form an FIR filter which predicts (interpolates) a phase error at a midpoint of the times $i$ and $i+1$ by $$X'_i = K(X_i + X_{i+1}) + (0.5-K)(X_{i-1} + X_{i+2}) \quad (1)$$

where $X_i$ is the phase error at the time i. FIG. 6A shows a time relation.

Linear interpolation is made between $X_i$, $X'_i$ and $X_{x+1}$ to produce the velocity error correction waveform signal.

The first and second subtractors 34 and 35, the switch 36, the integrator 37 and the output terminal 39 of FIG. 5 perform the linear interpolation.

Figure 6B:
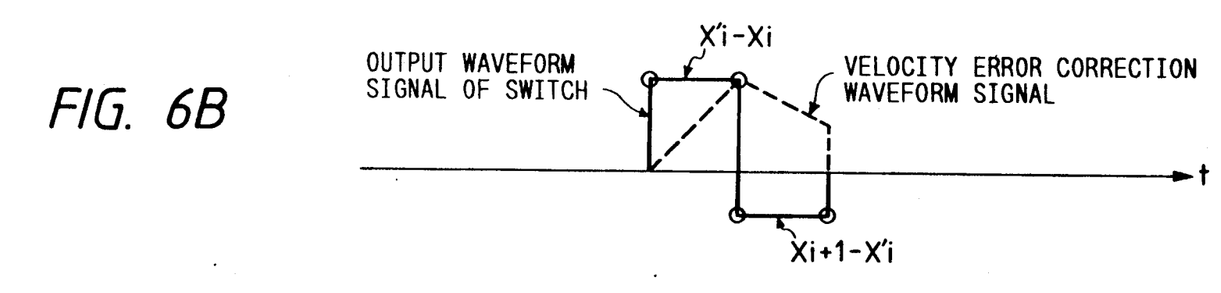
Figure 6C:
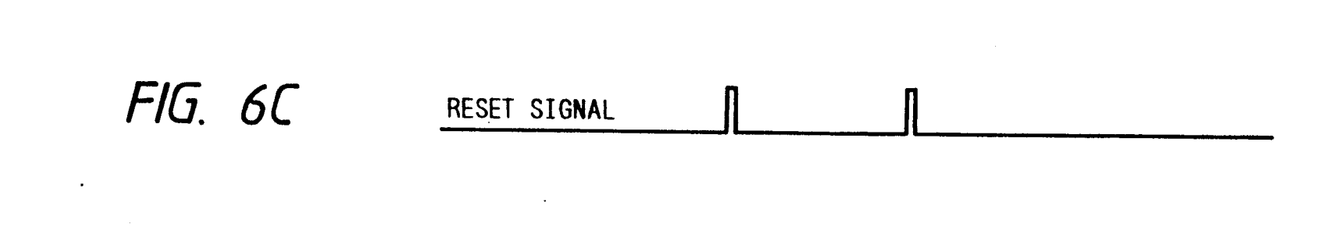
Figure 6D:
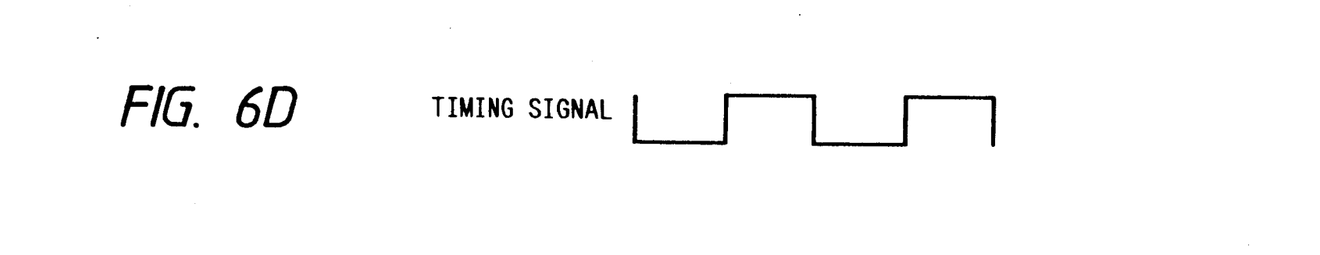

The outputs of the first and second subtractors 34 and 35 of FIG. 5 are $X'_i - X_i$ and $X_{i+1} - X'_i$, respectively, which are controlled by the switch 36 by the timing signal FH of FIG. 6D to switch them at the midpoint of the 1H period. They are integrated by the integrator 37 which is reset at each 1H period by the reset signal of FIG. 6C to produce a two-segment waveform signal which linearly interpolates $X_i$, $X'_i$ and $X_{i+1}$. It is outputted from the output terminal 39 as the velocity error correction waveform signal.

FIG. 6B shows the output waveform signal (solid line) and the velocity error correction wave signal (broken line) of the switch 36.

Figure 7:
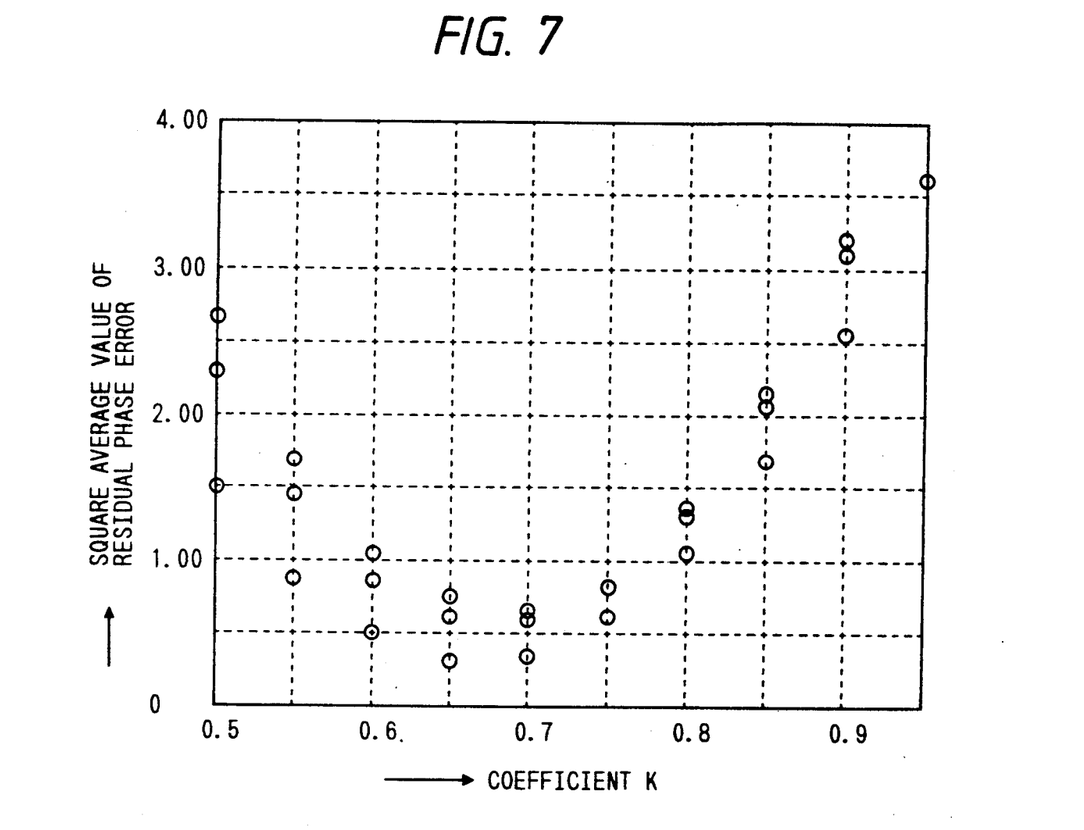
FIG. 7 shows square mean values of residual phase errors for a coefficient K of a coefficient circuit in the waveform signal generator of FIG. 5.

The coefficient K of the above formula (1) should be selected to minimize the residual phase error, FIG. 7 shows data of square mean values of the residual phase errors for various coefficients K obtained by measuring jitter waveform signals. The residual phase error is minimum when the coefficient K is between 0.65-0.7. It is seen that K in the range of 0.6-0.8 is practically effective.

Figure 8A:
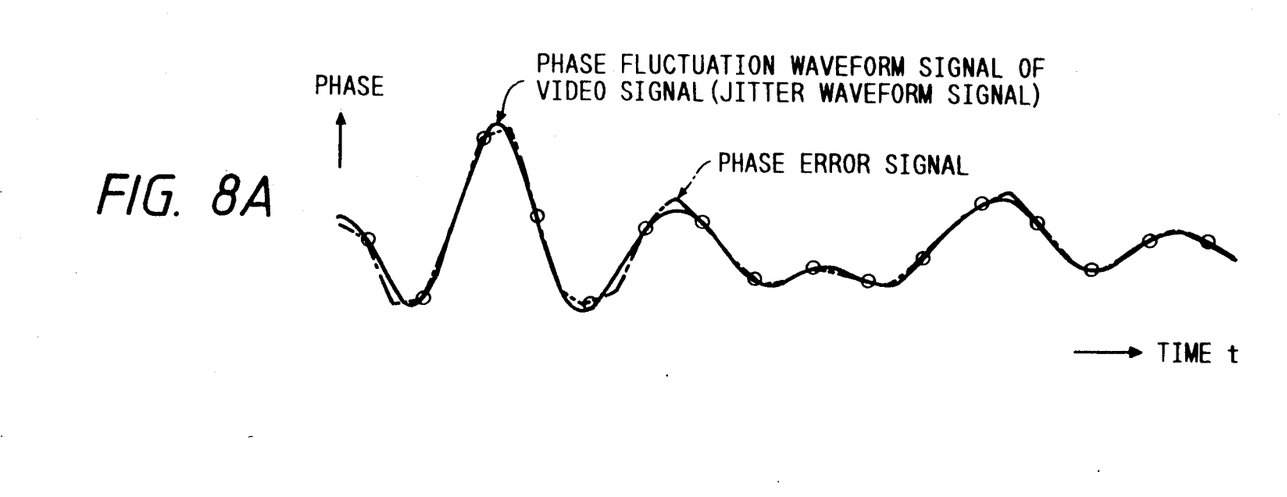
FIGS. 8A and 8B show timing charts for explaining an operation of the circuit of FIG. 5.
Figure 8B:
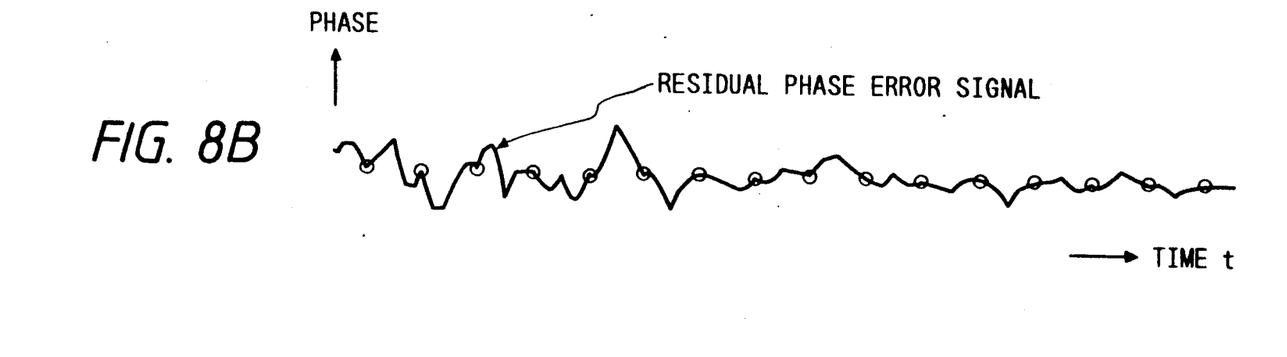

FIG. 8 shows a graph of the residual phase error for the same phase waveform signal as that of FIG. 3, when the coefficient K is set to 0.7. An ordinate represents a phase and an abscissa represents a time t.

A solid line in FIG. 8 shows a waveform of the phase variation waveform signal (jitter waveform signal) of the video signal, and a chain line shows a waveform of the phase error signal. FIG. 8B shows a waveform of the residual phase error signal. It is apparent from the comparison of FIG. 8 and FIG. 3 that the residual phase error in the present invention is reduced to one half of that of the prior art.

In the present embodiment, the waveform signal generator 25 receives the phase error signal and calculates it in accordance with the formula (1).

Figure 9:
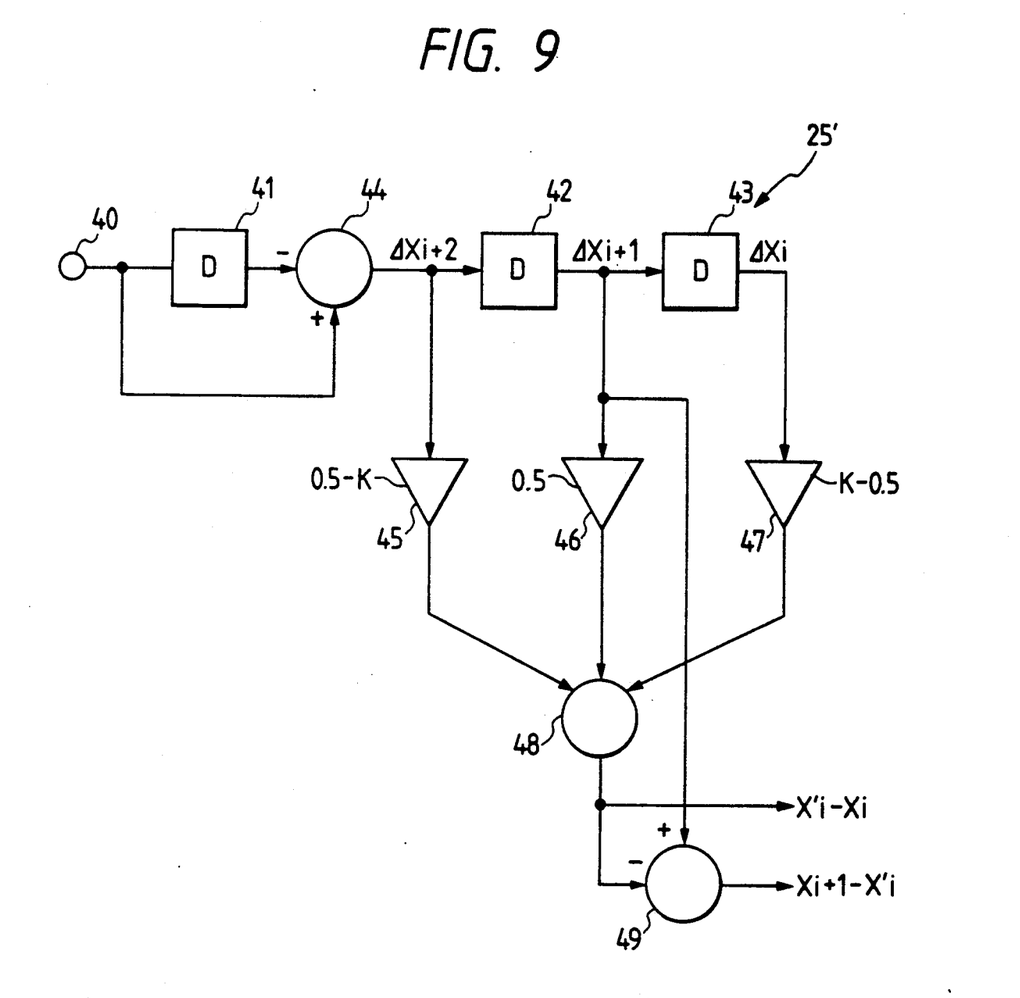
FIG. 9 shows a block diagram of a circuit configuration of a waveform signal generator in another embodiment of the time base correcting device of the present invention.

In another embodiment of the present invention, the formula (1) is modified to $$X'_i - X_i = (K - 0.5)\Delta X_i + 0.5\Delta X_{i+1} + (0.5 - K)\Delta X_{i+2} \quad (2)$$

$$X_{i+1} - X'_i = \Delta X_{i+1} - (X'_i - X_i) \quad (3)$$

where $\Delta X_i = X_i - X_{i-1}$ and it is implemented by a waveform signal generator 25' shown in FIG. 9.

In FIG. 9, numeral 40 denotes an input terminal to which a phase error signal is applied, numerals 41, 42 and 43 denote first, second and third 1H delay circuits, numeral 44 denotes a subtractor which differentiates the phase error signal applied to the input terminal 40 and the output of the first 1H delay circuit 41, numerals 45, 46 and 47 denote coefficient circuits for weighting $0.5-K$, $0.5$ and $K-0.5$ to the outputs of the subtractor 44 and the second and third 1H delay circuits 42 and 43, respectively, numeral 48 denotes a first adder for adding the outputs of the first to third coefficient circuits 45-47 to produce $X'_i - X_i$ and numeral 49 denotes a second subtractor which differentiates the output $\Delta X_{i+1}$ of the second 1H delay circuit 42 and the output of the adder 48 to produce $X_{i+1} - X'_i$.

The output of the adder 48 and the output of the first subtractor 49 are equivalent to the outputs of the first and second subtractors 34 and 35 of FIG. 5, and the number of times of addition (subtraction) is one less than that of the embodiment of FIG. 5. The coefficient of the second coefficient circuit is 0.5. Since this can be implemented by one-bit shift in a digital circuit, the circuit scale may be compact.

In the above embodiments, the analog output of the first D/A converter 14 of FIG. 1 is processed. In this case, the 1H delay circuit may be implemented by a sample and hold circuit, the coefficient circuit and the adder may be implemented by resistor adders and the integration circuit may be implemented by an integration circuit comprising an operational amplifier and a feedback capacitor. Those arithmetic operations may be digitally carried out before the D/A conversion or before the signal is applied to the second memory 11. In such a case, more accurate arithmetic operation may be attained.

In accordance with the embodiments shown in FIGS. 5-8 and FIG. 9, in order to correct the velocity error of the time base correcting device, the phase error signals before and after the horizontal sync. period under consideration are weight-added to predict the phase error at the midpoint of the horizontal sync. period so that the velocity error is approximated by two segments. Thus, more accurate correction of the jitter is attained and the residual phase error is significantly reduced.

A further embodiment of the present invention is now explained with reference to FIG. 10.

Figure 10:
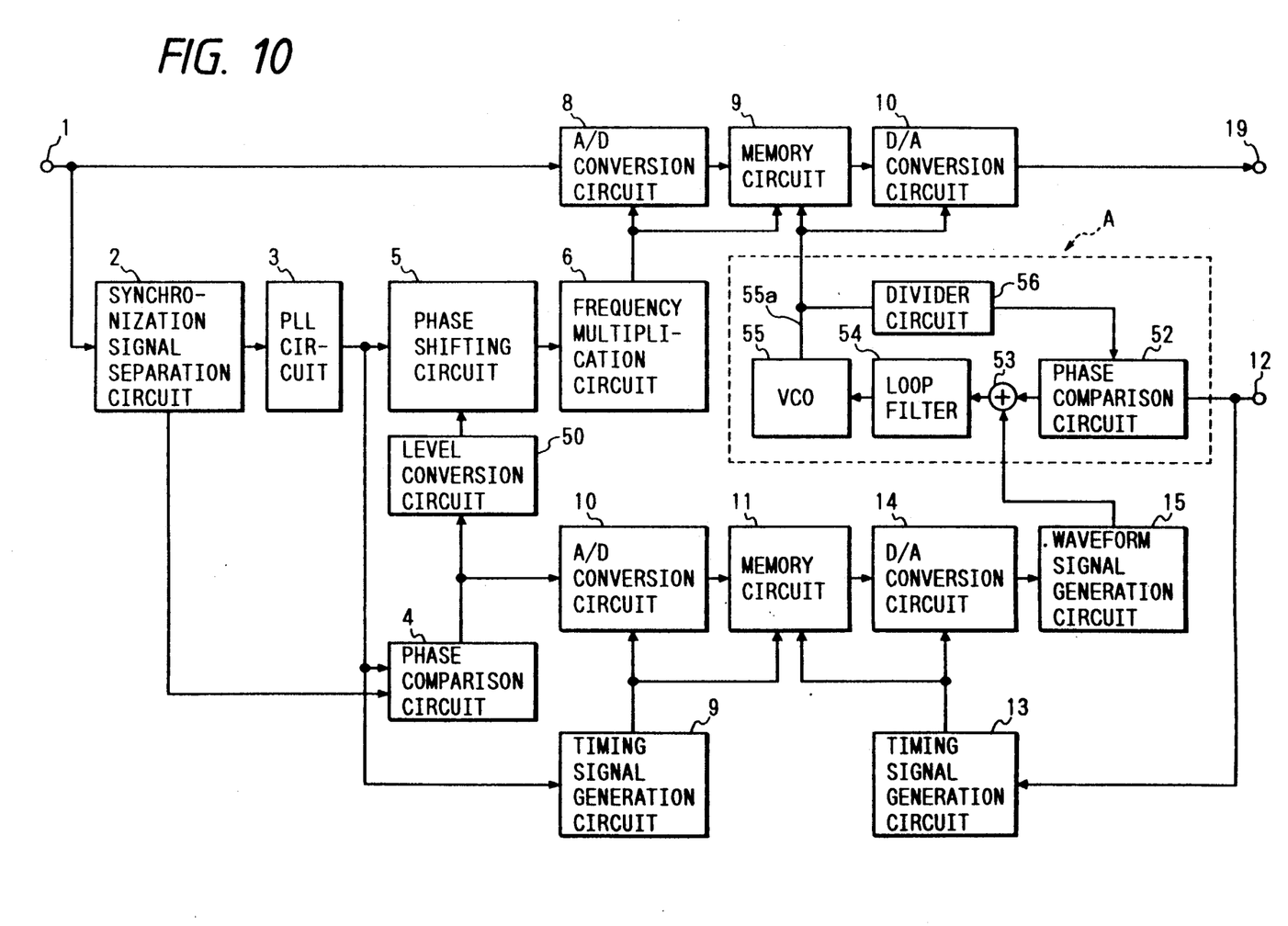
FIG. 10 shows a block diagram of a further embodiment of the time base converting device of the present invention.

FIG. 10 shows a block diagram of the time base correcting device in accordance with the further embodiment of the present invention. The like elements to those shown in the circuit of FIG. 1 are designated by the like numerals and the explanation thereof is omitted.

In FIG. 10, numeral 50 denotes a level conversion circuit which adjusts a level of the error signal applied to the phase shift circuit 5.

Numeral 52 denotes a first phase comparator which compares phases of a stable reference clock applied to the clock input terminal 14 and a target clock.

The first phase comparator 52 and the phase comparator (second phase comparator) 4 for detecting the velocity error are of the same configuration and input/output characteristic. Numeral 53 denotes an adder (adding means) for adding the output of the first phase comparator 52 and the velocity error voltage, that is, the output of the second phase comparator 4, numeral 54 denotes a loop filter having a sufficient gain in a low frequency band for determining a response speed, numeral 55 denotes a voltage controlled oscillator (VCO) which acts as oscillation means, and numeral 56 denotes a frequency divider which frequency-divides the output clock of the VCO 55 by a factor of N and supplies it to one input of the first phase comparator 52.

The first and second phase comparators 52 and 4 may be of different circuit configuration from each other so long as substantially same input/output characteristic is attained, or they may be adjusted to exhibit substantially same input/output characteristic when they have different inherent input/output characteristics.

An operation of a block circled by broken lines in FIG. 10 is now explained. A loop comprising the first phase comparator 52, the loop filter 54, the VCO 55 and the frequency divider 56 form a PLL circuit A which is set to produce a clock of a predetermined frequency at the clock output terminal 55a (that is, the output of the VCO 55) when the output of the adder 53 is zero.

When the input voltage of the velocity error voltage to the adder 53 is $V_1$, the PLL circuit A phase-locks such that the output voltage of the first phase comparator 52 is $-V_i$.

This means that, when the first phase comparator 52 is of the same input/output characteristics as that of the second phase comparator 4 for detecting the velocity error, the phase difference between the two inputs to the second phase comparator 4 is equal to the detected velocity error in the absolute value and opposite in the sign. Namely, where the velocity error is determined by the OD linear proximation of $0-\phi$, the phase difference of the output clock of the frequency divider 56 to the output clock of the PLL circuit A linearly changes between 0 and $-\phi$. Thus, the clock which follows the velocity error is produced at the clock output terminal 51.

Other operations in FIG. 10 are identical to those of the prior art device shown in FIG. 1 and the explanation thereof is omitted.

In accordance with the embodiment shown in FIG. 10, the clock which follows the jitter contained in the video signal is produced with a very simple configuration. The adjustment required in assembling the circuit is less and the high accuracy is readily attained.

What is claimed is:

1. A time base correcting device comprising:
    (a) input means for inputting a video signal including a sync. signal and a burst signal;
    (b) means for generating a first clock signal synchronized with the sync. signal of the video signal inputted by said input means;
    (c) phase difference detection means for detecting a phase difference between said burst signal and said first clock signal at a predetermined interval to produce an error signal representing said phase difference;
    (d) phase adjustment means for adjusting the phase of said first clock in accordance with said error signal;
    (e) a memory for storing the video signal supplied from said input means in synchronism with said first clock supplied through said phase adjustment means;
    (f) interpolation means for generating an interpolation signal at said predetermined interval by using a plurality of error signals produced by said phase difference detection means which are successive along a time base; and
    (g) readout control means for controlling the readout from said memory by using a difference between said interpolation signal and said error signal.

2. A time base correcting device according to claim 1 wherein said interpolation means include at least one series-connected delay circuit for delaying said error signal by said predetermined interval and an adder for weight-adding the output of said delay circuit to produce the interpolation signal.

3. A time base correcting device according to claim 2 wherein said readout control means includes a pair of subtractors for calculating differences between said interpolation signal from said adder, and two error signals close to said interpolation signals on the time base.

4. A time base correcting device according to claim 3 wherein said readout control means further includes an integrator for sequentially integrating the outputs of said pair of subtractors.

5. A time base correcting device according to claim 1, wherein said interpolation means includes a subtractor for differentiating the error signals adjacent along the time base, at least one series-connected delay circuit for delaying the output of said subtractor by said predetermined interval and an adder for weight-adding the output of said delay circuit to produce differences between the error signals adjacent along the time base and the interpolation signal.

6. A time base correction device according to claim 1 wherein said readout control means includes an integrator for integrating the differences between the error signals adjacent along the time base and the interpolation signal.

7. A time base correcting device according to claim 6 wherein said readout control means further includes reset means for resetting said integrator at said predetermined interval.

8. A time base correcting device according to claim 6 wherein said readout control means further includes a phase adjustment circuit for adjusting a phase of a clock having a predetermined frequency by the output of said integrator to produce a second clock for controlling the readout of said memory.

9. A time base correcting device comprising:
    (a) input means for inputting a video signal including a signal of a predetermined frequency;

(b) a memory for storing the video signal inputted by said input means;

(c) phase variation detection means for detecting a phase variation in said signal of the predetermined frequency to produce an error signal related to the phase variation;

(d) interpolation means for generating an interpolation signal by using a plurality of error signals produced by said phase variation detection means which are successive along a time base; and (e) readout control means for controlling the readout from said memory by using a difference between said interpolation signal and selected of said error signals.

10. A time base correcting device according to claim 9 wherein said readout control means includes a linear interpolation circuit for linearly interpolating the error signals adjacent along the time base and the interpolation signal.

11. A time base correcting device according to claim 10 wherein said linear interpolation circuit includes an integrator for integrating the differences between the error signals and the interpolation signal and reset means for resetting said integrator at said predetermined interval.

12. A time base correcting device according to claim 10 wherein said readout control means further includes a phase adjustment circuit for adjusting the phase of a clock of a predetermined frequency by the output of said linear interpolation circuit to produce a clock for controlling the readout of said memory.

13. A time base correcting device comprising:

(a) memory means for storing an input video signal including a signal of a predetermined frequency;

(b) phase variation detection means for detecting a phase variation in said signal of the predetermined frequency to produce an error signal related to the phase variation;

(c) interpolation means for generating an interpolation signal by using a plurality of error signals produced by said phase variation detection means which are adjacent along a time base; and (d) readout control means controlling readout from said memory means by using a difference between said interpolation signal and at least one of said error signals.

14. A time base correcting device comprising:

(a) input means for inputting a video signal including a signal of a predetermined frequency;

(b) a memory for storing the video signal inputted by said input means;

(c) phase variation detection means for detecting a phase variation in said signal of the predetermined frequency to produce an error signal related to the phase variation;

(d) modifying means for generating a modified error signal by using at least three error signals produced by said phase variation detection means which are adjacent along a time base; and (e) readout control means for controlling readout from said memory by using at least one of said three error signals and said modifier error signal.

15. A time base correcting device according to claim 14 wherein said modifying means includes a circuit for weight-adding at least three error signals.

16. A time base correcting device comprising:

(a) input means for inputting a video signal including a signal of a predetermined frequency;

(b) phase variation detection means for detecting a phase variation of said signal of the predetermined frequency to produce an error signal related to the phase variation;

(c) modifying means for generating a modified error signal by using at least three error signals produced by said phase variation detection means which are successive along a time base; and (d) means for eliminating a time base variation of the video signal by using at least one of said three error signals and said modified error signal.

17. A time base correcting device comprising:

(a) input means for inputting a video signal including a sync. signal and a burst signal;

(b) means for generating a clock signal synchronized with the sync. signal of the video signal inputted by said input means;

(c) first phase comparison means for comparing phases of said burst signal and said clock signal at a predetermined interval to produce a first error signal;

(d) phase adjustment means for adjusting the phase of said clock in accordance with said first error signal;

(e) memory means for storing the video signal supplied from said input means in synchronism with said clock supplied through said phase adjustment means;

(f) controlled oscillation means;

(g) second phase comparison means for comparing the phases of the output of said controlled oscillation means and a signal of a predetermined frequency to produce a second error signal; said second phase comparison means having substantially identical input/output characteristic to that of said first phase comparison means;

(h) adding means for adding a signal related to said first error signal and said second phase error signal and supplying the sum to said controlled oscillation means; and (i) readout control means for controlling the readout from said memory means by the output signal of said controlled oscillation means.

18. A time base correcting device according to claim 17 further comprising linear interpolation means for linearly interpolating the first error signals adjacent along the time base.

19. A time base correcting device according to claim 18 wherein said linear interpolation means includes an integrator for integrating the differences between said first error signals and reset means for resetting said integrator at said predetermined interval.

20. A time base correcting device comprising:

(a) input means for inputting a video signal including a sync. signal of a predetermined frequency and a burst signal;

(b) means for generating a clock signal synchronized with the sync. signal of the video signal inputted by said input means;

(c) first phase comparison means for comparing phases of said burst signal and said clock signal to produce a first error signal;

(d) memory means for storing the video signal supplied from said input means in accordance with said first error signal;

(e) second comparison means for comparing phases of a signal having a frequency determined by said first error signal and a signal of a predetermined frequency to produce a second error signal; said second comparison means having an input/output characteristic substantially identical to that of said first comparison means; and (f) readout control means for controlling the readout from said memory by said second phase error signal.

21. A time base correcting device comprising:
(a) input means for inputting a video signal including a sync. signal and a burst signal;
(b) means for generating a clock signal synchronized with the sync. signal of the video signal inputted by said input means;
(c) first phase comparison means for comparing phases of said burst signal and said clock signal to produce a first error signal;
(d) second comparison means for comparing phases of a signal having a frequency determined by said first error signal and a signal of a predetermined frequency to produce a second error signal; said second comparison means having an input/output characteristic substantially identical to that of said first comparison means; and
(e) means for eliminating a time base variation of the video signal by said first and second phase error signals.

22. A method for eliminating a time base variation in a cyclic video signal including a signal of a predetermined frequency, comprising the steps of:
(a) providing an error signal related to a phase variation of said signal of a predetermined frequency in a first cycle of said video signal;
(b) obtaining at least one further error signal related to a phase variation of said signal of a predetermined frequency in at least one successive cycle of said video signal; and
(c) eliminating said time base variation of the video signal by non-linear computation based on both said error signal and said further error signal.

* * * * *

UNITED STATES PATENT AND TRADEMARK OFFICE
CERTIFICATE OF CORRECTION

PATENT NO. : 5,335,077
DATED : August 2, 1994
INVENTOR(S) : Yamashita et al.

It is certified that error appears in the above-identified patent and that said Letters Patent is hereby corrected as shown below:

```
Col. 1, line 58 change "sinc." to --sync--
Col. 3, line 12 delete "a"
Col. 4, lines 19, 36, 50, change "other" to --another--
Col. 5, line 15, change "other" to --another--
Col. 7, line 42, change "X'₁" to --X'ᵢ--
Col. 7, line 43, change "Xₓ" to --Xᵢ--
Col. 9, line 53, delete "OD"
Col. 10, line 27, change "include" to --includes--
Col. 11, line 13, delete "selected of"
Col. 12, line 34, change "characteristic" to --characteristics--
Col. 12, line 59, delete "phase"
Col. 13, line 13, delete "phase"
```

Signed and Sealed this

First Day of November, 1994

*Attest:*

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,335,077

DATED : August 2, 1994

INVENTOR(S) : Shinichi Yamashita et al.

It is certified that error appears in the above-identified patent and that said Letters Patent is hereby corrected as shown below:

Cover page, item [73]. Insert -- [73] Assignee: Canon Kabushiki Kaisha, Tokyo, Japan --.

Signed and Sealed this

Fourteenth Day of February, 1995

*Attest:*

BRUCE LEHMAN

*Attesting Officer*     *Commissioner of Patents and Trademarks*